United States Patent [19]
Kang

[11] Patent Number: 5,740,172
[45] Date of Patent: Apr. 14, 1998

[54] METHOD FOR SEARCHING A PACKET TRANSMISSION PATH IN A BROADBAND INFORMATION AND COMMUNICATION SYSTEM

[75] Inventor: Sung-Bong Kang, Seoul, Rep. of Korea

[73] Assignee: SamSung Electronics Co., Ltd., Suwon, Rep. of Korea

[21] Appl. No.: 663,586

[22] Filed: Jun. 10, 1996

[30] Foreign Application Priority Data

Jun. 9, 1995 [KR] Rep. of Korea ............ 15234/1995

[51] Int. Cl.$^6$ ...................................... H04L 12/56
[52] U.S. Cl. .................. 370/392; 370/389; 370/351; 370/412
[58] Field of Search ...................... 370/352, 353, 370/354, 355, 356, 389, 392, 393, 401, 402, 404, 406, 408, 412

[56] References Cited

U.S. PATENT DOCUMENTS

| | | | |
|---|---|---|---|
| 5,048,011 | 9/1991 | Melen | 370/422 |
| 5,222,085 | 6/1993 | Newman | 370/422 |
| 5,365,520 | 11/1994 | Wang et al. | 370/217 |
| 5,408,472 | 4/1995 | Hluchyj et al. | 370/416 |
| 5,453,979 | 9/1995 | Schibler et al. | 370/395 |
| 5,473,603 | 12/1995 | Iwata | 370/426 |
| 5,491,690 | 2/1996 | Alfonsi et al. | 370/404 |
| 5,497,371 | 3/1996 | Ellis et al. | 370/412 |
| 5,500,858 | 3/1996 | McKeown | 370/412 |
| 5,610,904 | 3/1997 | Eng et al. | 370/408 |

*Primary Examiner*—Wellington Chin
*Assistant Examiner*—Soon-Dong Hyun
*Attorney, Agent, or Firm*—Robert E. Bushnell, Esq.

[57] ABSTRACT

A method of searching for a packet transmission path in a broadband information and communication system includes the steps of temporarily storing an incoming packet containing a destination subscriber's address to which the packet should be transmitted; checking whether any packet has ever been transmitted to the address contained in the stored packet; when it is determined that any packet has ever been transmitted to the address, transmitting the stored packet over a path over which previous packet has been transmitted to the address; when it is determined that no packet has been transmitted to the address contained in the stored packet, sequentially searching for a corresponding packet transmission path for transmitting the stored packet, storing a searched path together with the address, and then transmitting the stored packet over the searched path.

14 Claims, 4 Drawing Sheets

| DESTINATION SUBSCRIBER'S ADDRESS | PACKET TRANSMISSION PATH | FREQUENCY OF USE |
|---|---|---|
| ADDR_1 | B-ISDN | 5 |
| ADDR_2 | ETHERNET | 3 |
| ⋮ | ⋮ | ⋮ |
| ADDR_N | FDDI | 1 |

| DESTINATION SUBSCRIBER'S ADDRESS | PACKET TRANSMISSION PATH |
|---|---|
| ADDR_1 | B-ISDN |
| ADDR_2 | ETHERNET |
| ⋮ | ⋮ |
| ADDR_N | FDDI |

*Fig. 3*

| DESTINATION SUBSCRIBER'S ADDRESS | PACKET TRANSMISSION PATH | FREQUENCY OF USE |
|---|---|---|
| ADDR_1 | B-ISDN | 5 |
| ADDR_2 | ETHERNET | 3 |
| ⋮ | ⋮ | ⋮ |
| ADDR_N | FDDI | 1 |

*Fig. 5A*

| DESTINATION SUBSCRIBER'S ADDRESS | PACKET TRANSMISSION PATH |
|---|---|
| ADDR_1 | B-ISDN |
| ADDR_2 | ETHERNET |
| ⋮ | ⋮ |
| ADDR_N | FDDI |

*Fig. 5B*

METHOD FOR SEARCHING A PACKET TRANSMISSION PATH IN A BROADBAND INFORMATION AND COMMUNICATION SYSTEM

CROSS-REFERENCE TO RELATED APPLICATION

This application makes reference to, incorporates the same herein, and claims all benefits accruing under 35 U.S.C. §119 from an application for Method For Searching A Packet Transmission Path In A Broadband Information And Communication System earlier filed in the Korean Industrial Property Office on 9 Jun. 1996, and there duly assigned Ser. No. 15234/1995.

BACKGROUND OF THE INVENTION

1. Technical Field

The present invention relates to a broadband information and communication system, and more particularly to a method for searching for a packet transmission path in a broadband information and communication system.

2. Background Art

Generally, communication networks are widely used to allow computers to communicate with one another. That is, a source computer uses a network to pass data information to a destination computer. The data information such as voice, video, image, graphics, text, computer data, control data, electronic funds and electronic mails is usually classified into two categories. Real time signals such as voice and video represent one class that presents a reasonably constant traffic load to the network. This class tolerates relatively high losses and error rates within the network, but is delay sensitive. Data signals such as computer data and electronic funds represent a class that presents a rapidly fluctuation of traffic load to the network. Although this class does not tolerate transmission errors, it is not delay sensitive, and consequently, can tolerate long and variable network delay. Due to the different characteristics of these two classes of traffic, two different methods of switching have developed, namely circuit switching for real time signals such as those disclosed in U.S. Pat. No. 5,258,977 for Switching Network For An Asynchronous Time-Division Multiplex Transmission System issued to Wolker et al., and packet switching for data signals in small packets such as those disclosed in U.S. Pat. No. 5,408,011 for Routing Method For Fast Packet Switching Systems issued to Melen.

Recent broadband technologies such as Asynchronous Transfer Mode (ATM) and fast packet switching architectures are being proposed for integrated circuit and packet switching applications disclosed, for example, in U.S. Pat. No. 5,222,085 for Self-Routing Switching Element And Fast Packet Switch issued to Newman, U.S. Pat. No. 5,491,690 for Method And Apparatus To Speed Up The Path Selection In A Packet Switching Network issued to Alsonsi et al., and U.S. Pat. No. 5,497, 371 for Digital Telecommunication Link For Efficiently Transporting Mixed Classes Of Packets issued to Ellis. These broadband technologies are characterized by cell switched data. The main advantage of cell switching is that it minimizes switching delays caused by voice, video, and data interactions and it is suitable for hardware accelerated routing. Long data packets do not adversely interfere with delay sensitive voice packets.

These broadband communication networks generally include a plurality of interconnected switching nodes which, in turn, are connected to end nodes supporting data processing equipment. Such networks can become quite large with an extensive geographical distribution. In such a situation, the selection of an efficient packet transmission path between a source and a destination node becomes of paramount importance. There are known methods of selecting the optimal path through the networks such as disclosed in U.S. Pat. No. 5,365,520 for Dynamic Signal Routing issued to Wang et al., and U.S. Pat. No. 5,491,690 for Method And Apparatus To Speed Up The Path Selection In A Packet Switching Network issued to Alfonsi et al. Generally, the packet transmission path is selected individually for each packet. For instance, when an incoming packet containing one's own address and a destination subscriber's address is received and is temporarily stored in the network, the packet transmission path over which the stored packet as registered at a queue is searched by a central controller. If the packet transmission path is searched, the central controller transmits the stored packet over the packet transmissic,n path. If, on the other hand, the packet transmission path is not searched, the central controller typically proceeds to generate transmission errors. Since the conventional path selection techniques for broadband communication networks require that the path selection must be done individually for each packet, I have observed that the path selection time required to select a packet transmission path is consuming and onerous, particularly when an incoming sequence of packets contain the same destination subscriber's address. In addition, the conventional path selection techniques also require extremely valuable processing time for the central controller to search for the optimal packet transmission path, particularly when there are many destination subscribers' addresses stored at the registered queue. Accordingly, a novel and improved packet selection path method for a broadband communication network can be contemplated.

SUMMARY OF THE INVENTION

It is therefore an object of the present invention to provide an improved broadband information and communication system.

It is another object to provide an improved path selection method for effectively and efficiently reducing the time required to search for a packet transmission path in a broadband information and communication system.

It is yet another object of the present invention to provide a method for effectively searching for a packet transmission path in a broadband information and communication system when a sequence of packets contain identical destination address.

These and other objects of the present invention may be achieved with an improved method for searching a packet transmission path in a broadband information and communication system including a region memory having a registered queue for storing a plurality of destination subscribers' addresses and corresponding packet transmission paths and a used queue for storing the frequencies of use of the packet transmission paths associated with the destination subscriber's addresses. The path searching method includes the steps of temporarily storing an incoming packet containing the destination subscriber's address to which the packet should be transmitted; initially searching for a corresponding packet transmission path for transmitting the stored packet at the used queue by checking whether any packet has ever been transmitted to the address contained in the stored packet; when it is determined that no packet has ever been transmitted over the path corresponding to the destination subscriber's address contained in the stored packet, searching next for a corresponding packet transmission path for transmitting the stored packet at the registered queue; storing at the used queue the packet transmission path searched at the second searching step, and transmitting the temporarily stored packet over the path searched at the initial or second searching step.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 3 illustrates a memory map of a region memory of the typical broadband information and communication system of FIG. 1 for use in the conventional searching for a packet transmission path between two end nodes;

FIGS. 5A and 5B illustrate a memory map of a region memory of the broadband information and communication system of FIG. 1 including a registered queue and a used queue for use in the searching for a packet transmission path between two end nodes according to the principles of the present invention.

DETAILED DESCRIPTION OF THE PREFERRED EMBODIMENT

Figure 1:
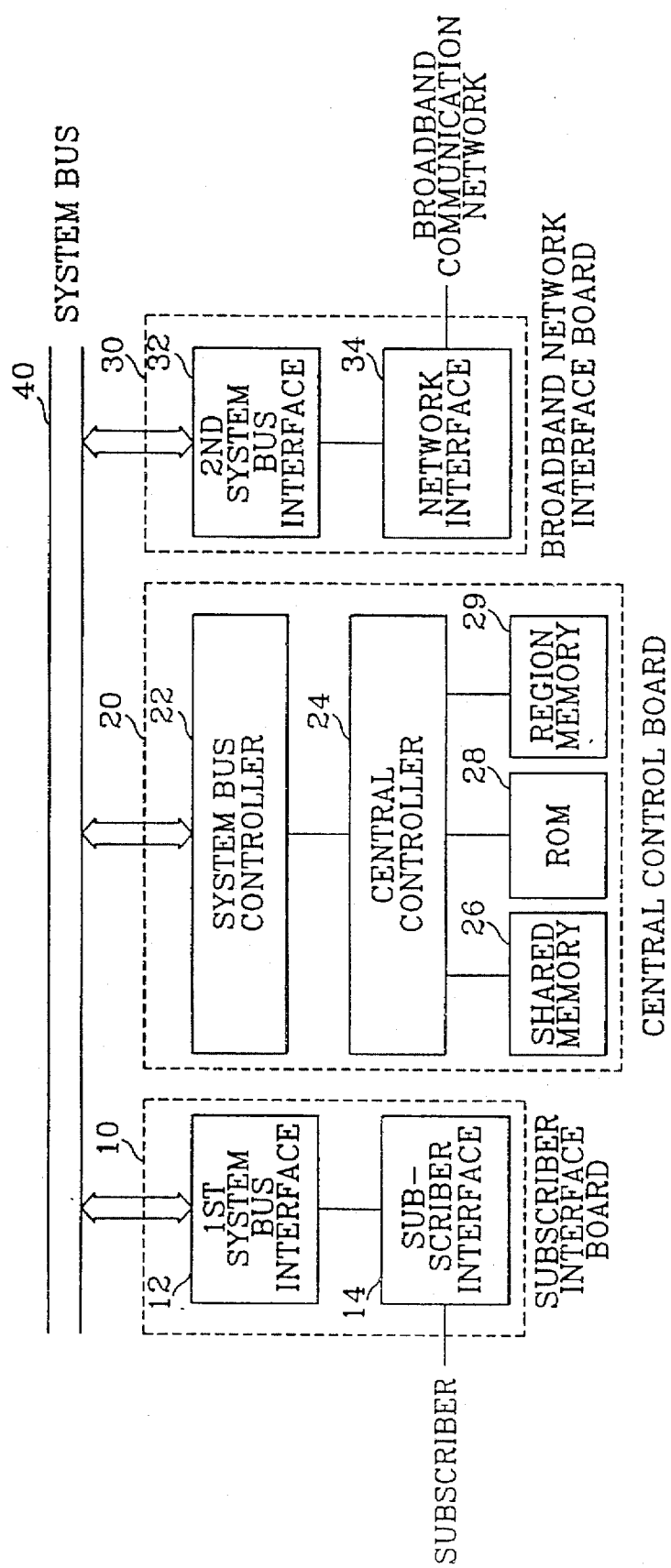
FIG. 1 is a block diagram illustrating the construction of a typical broadband information and communication system constructed according to the principles of the present invention.

Referring now to the drawings and particularly to FIG. 1, which illustrates a typical broadband information and communication system for an integrated circuit switching and packet switching constructed according to the principles of the present invention. The broadband information and communication system includes a subscriber interface board 10, a central control board 20 and a broadband network interface board 30 all connected to a system bus 40.

Referring to FIG. 1, the subscriber interface board 10 includes a subscriber interface unit 14 for an interface with a source subscriber and a first system bus interface unit 12 for transmitting services for the source subscriber through a system bus 40.

The broadband network interface board 30 includes a network interface unit 34 for an interface with a broadband communication network and a second system bus interface unit 32 for an interface between the central control board 20 and the network interface unit 34 through the system bus 40.

The central control board 20 includes a system bus controller 22 for controlling data transmitted/received between the subscriber interface board 10 and the broadband network interface board 30, and a central controller 24 for controlling the overall operation of the broadband information and communication system. A shared memory 26 is connected to the central controller 24, for storing data output from the subscriber interface board 10 and the broadband network interface board 30. A read-only-memory (ROM) 28 is used for storing data required for operating the central controller 24, and a region memory 29 is used for storing data generated while processing operations of the central controller 24.

Figure 2:
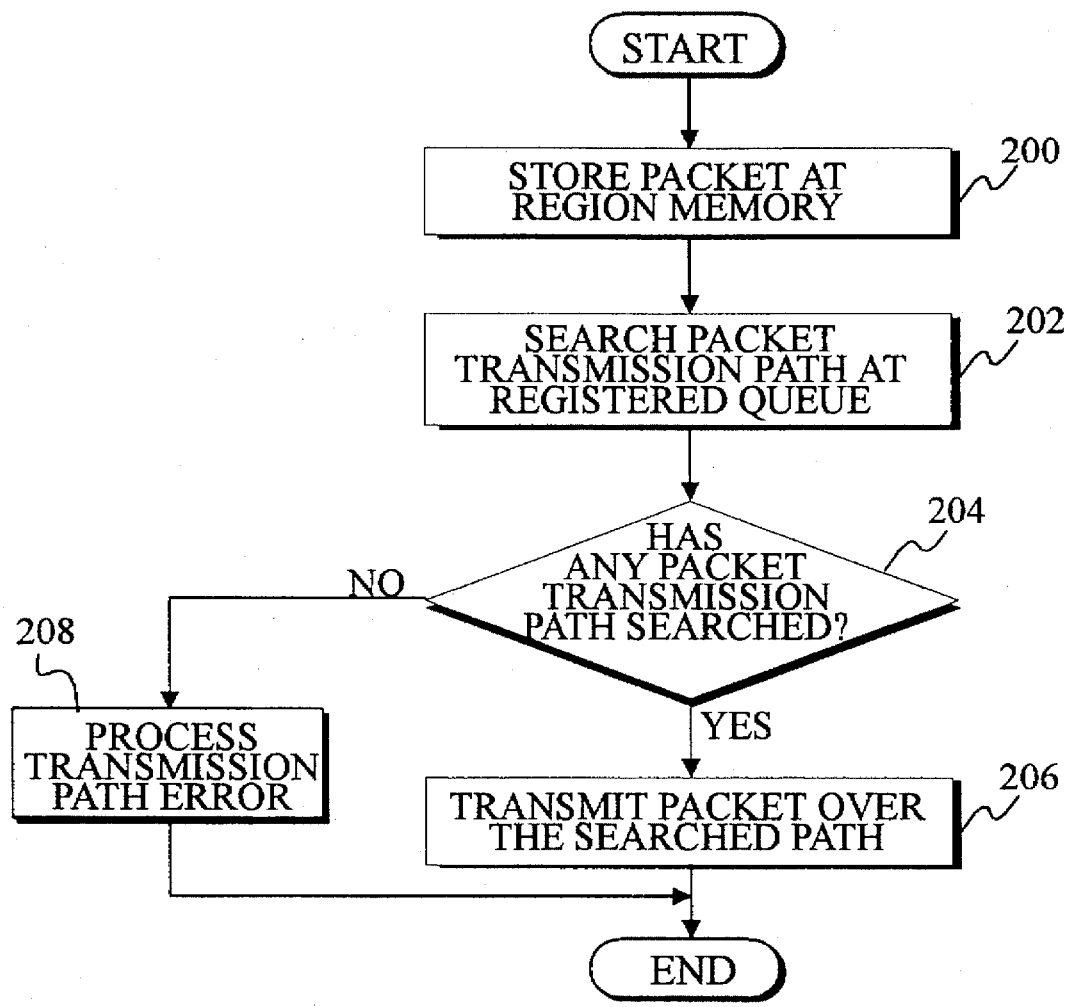
FIG. 2 is a flow chart illustrating a conventional method of searching for a packet transmission path between two end nodes in the typical broadband information and communication system.

In case of transmitting am individual packet in a broadband information and communication system as shown in FIG. 1, the packet is transmitted after a packet transmission path is searched as illustrated in FIG. 2. When the packet transmission path is searched according to the conventional method as illustrated in FIG. 2, the region memory 29 of FIG. 1 contains a memory map having a registered queue for storing a plurality of destination subscribers' addresses and their corresponding packet transmission paths as shown in FIG. 3. The conventional method of searching for a packet transmission path in the broadband information and communication system will be described with reference to FIGS. 1 to 3 as follows.

When an incoming packet containing one's own address and a destination subscriber's address is received through the subscriber interface board 10, the central controller 24 receives and stores the packet through the system bus controller 22 at the region memory 29 at step 200. Once the packet is stored in the region memory 29 at step 200, the central controller 24 searches for a packet transmission path over which the stored packet should be transmitted, at a registered queue in which the destination subscriber's addresses and the paths corresponding thereto are stored at step 202. The central controller 24 then determines whether a corresponding packet transmission path has been searched at step 204. When the corresponding packet transmission path has been searched at step 204, the central controller 24 transmits the stored packet over the searched path at step 206. However, if the corresponding packet transmission path has not been searched, the central controller 24 proceeds to step 208 for error processing. Interface units such as a broadband Integrated Services Digital Network (B-ISDN), ETHERNET or Fiber Distributed Data Interface (FDDI) may be used as a packet transmission path.

In the conventional method of searching for a packet transmission path between two end nodes in a broadband information and communication system, however, the packet transmission path must be selected individually for each packet. For this reason, I have observed that the path selection time required to select a packet transmission path is excessively laborious, particularly when an incoming sequence of packets contain the same destination subscriber's address. This results in a waste of valuable processing time of the broadband information and communication system which may affect the quality of services for real time signals such as voice and video. Moreover, the conventional path selection method also requires extremely valuable processing time for the central controller to search for the optimal packet transmission path, particularly when there are many destination subscribers' addresses stored at the registered queue.

Figure 4:
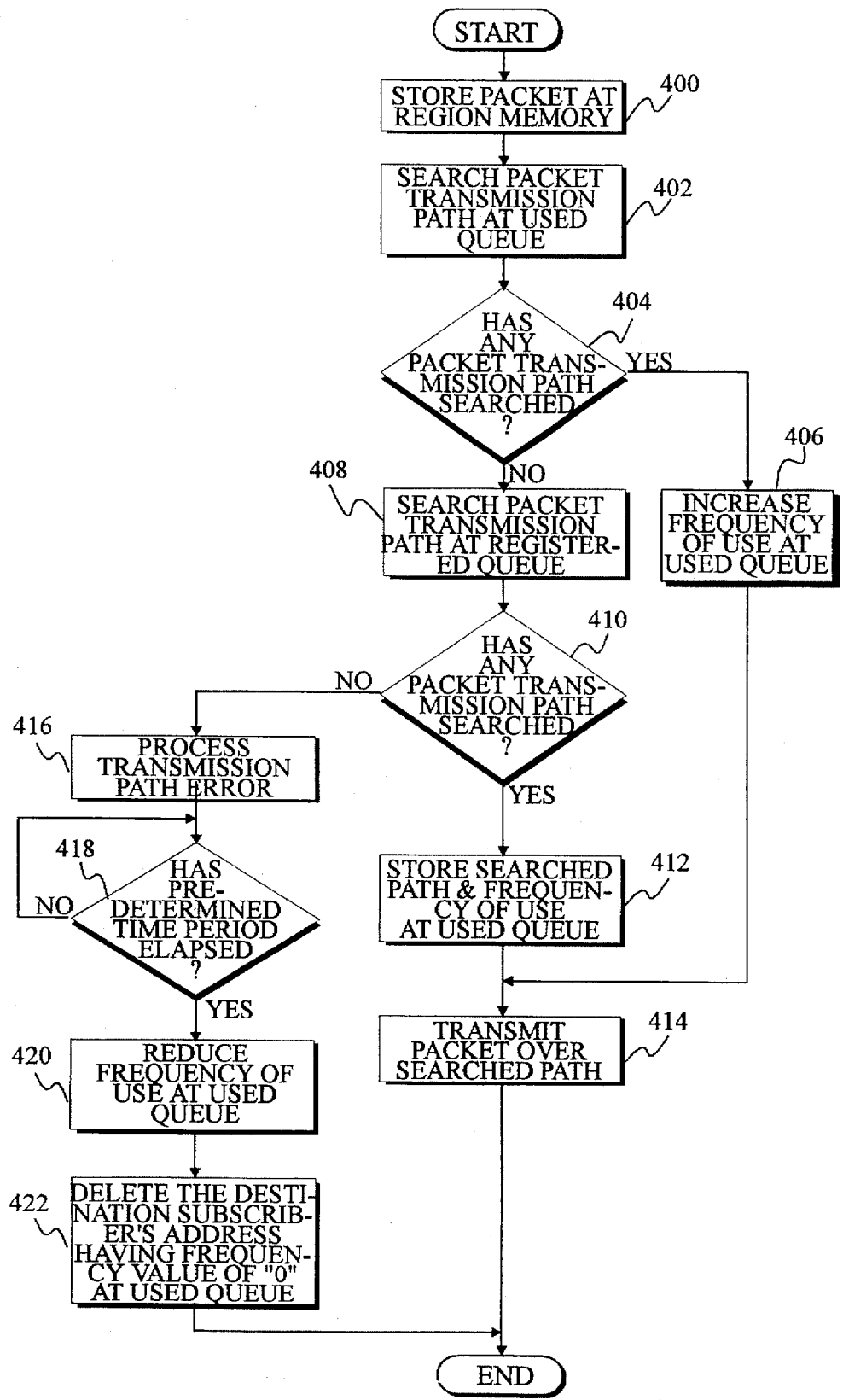
FIG. 4 is a flow chart illustrating an improved method of searching for a packet transmission path between two end nodes in a broadband information and communication system constructed according to the principles of the present invention.

Turning now to FIG. 4 which illustrates an improved method of searching for a packet transmission path in a broadband information and communication system constructed according to the principles of the present invention. For the sake of brevity, the broadband information and communication system according to a preferred embodiment of the present invention has the same construction and reference numerals as FIG. 1. However, the central controller 24 is constructed to perform a packet transmission path search operation as illustrated in FIG. 4. In addition, the read-only-memory (ROM) 28 stores a search program according to a flow chart as shown in FIG. 4 and a region memory 29 includes a memory map of a used queue having a plurality of destination subscribers' addresses and corresponding packet transmission paths and frequencies of use as shown in FIGS. 5A and a memory map of a registered queue having a plurality of destination subscribers' addresses and corresponding packet transmission paths as shown in 5B. The improved method of searching for a packet transmission path in the broadband information and communication system constructed according to the principles of the present invention will now be described with reference to FIG. 1, 4 and 5 as follows.

When an incoming packet containing one's own address and a destination subscriber's address is received through the subscriber interface board 10, the central controller 24 receives and stores the packet through a system bus controller 22 at a region memory 29 at step 400. Once the packet is stored in the region memory 29 at step 400, the central controller 24 searches for a packet transmission path over which the stored packet should be transmitted, at a used queue in which the destination subscriber's addresses and the corresponding packet transmission paths and frequencies of use associated therewith are stored, as shown in FIG. 5A. In this case, if any packet has ever been transmitted to the destination subscriber's address included in the packet stored at the region memory 29, the central controller 24 can search for a packet transmission path at the used queue. If the central controller 24 determines that the corresponding packet transmission path has been searched at the used queue at step 404, the central controller 24 increases the frequency of use of the searched path by a constant unit (i.e., one) at step 406 and then transmits the packet over the searched path at step 414.

If, on the other hand, the central controller 24 determines that the corresponding packet transmission path has not been searched at the used queue at step 404, this means that no packet has been transmitted before or for a predetermined time period to the destination subscriber's address contained in the stored packet. Thus, at step 408, the central controller 24 searches for a corresponding packet transmission path at a registered queue in which the destination subscriber's addresses and the corresponding packet transmission paths associated therewith are stored, as shown in FIG. 5B. If it is checked at step 410 that a corresponding path is searched at the registered queue, the central controller 24 stores the searched path and its frequency of use at the used queue at step 412, and then transmits the packet over the searched path at step 414.

When the central controller 24 determines that a corresponding packet transmission path has not been searched at the registered queue at step 410, the central controller 24 proceeds to step 416 for error processing and then determines, at step 418, whether a predetermined time period has elapsed. If it is determined that a predetermined time has elapsed, the central controller 24 reduces respective values of frequencies of use stored at the used queue by a constant unit (i.e., one) at step 420. Then the central controller 24 deletes the destination subscriber's address having a frequency value of "0" at the used queue at step 422.

As described above, the present invention is capable of reducing the time required to search for a packet transmission path by using a used queue in which the frequencies of use of respective paths are stored, as well as a registered queue. Particularly, in the case that a sequence of packets contain identical destination address, there is no need to repeat the same procedure to search for a corresponding packet transmission path, thereby reducing the time required to search for the packet transmission path in a broadband information and communication system.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of searching for a packet transmission path for transmission of packets between two end nodes in a broadband information and communication system, said method comprising the steps of:

receiving a packet from an originating subscriber, and temporarily storing said packet containing a destination subscriber's address in a region memory, said region memory including a first queue of packet transmission paths corresponding to destination subscribers' addresses and a frequency of use of the packet transmission paths corresponding to the destination subscribers' addresses, and a second queue of packet transmission paths corresponding to destination subscribers' addresses;

searching, at said first queue, for a corresponding packet transmission path over which the packet stored at said region memory is to be transmitted to the destination subscriber's address contained in the packet;

determining whether any packet has ever been transmitted to the destination subscriber's address contained in the packet over the packet transmission path at said first queue corresponding to the destination subscriber's address contained in the packet;

when it is determined that any packet has been transmitted to the destination subscriber's address contained in the packet over the packet transmission path at said first queue corresponding to the destination subscriber's address contained in the packet over which some packets have previously been transmitted to the destination subscriber's address, increasing the frequency of use of the packet transmission path at said first queue, and transmitting the packet stored in said region memory over the packet transmission path over which some packets have previously been transmitted to said destination subscriber's address;

when it is determined that no packet has been transmitted to the destination subscriber's address contained in the packet over the packet transmission path at said first queue corresponding to the destination subscriber's address contained in the packet, searching, at said second queue, for a corresponding packet transmission path over which the packet stored at said region memory is to be transmitted to the destination subscriber's address contained in the packet;

determining whether any packet has ever been transmitted to the destination subscriber's address contained in the packet over the packet transmission path at said second queue corresponding to the destination subscriber's address contained in the packet;

when it is determined that any packet has been transmitted to the destination subscriber's address contained in the packet over the packet transmission path at said second queue corresponding to the destination subscriber's address contained in the packet over which some packets have previously been transmitted to the destination subscriber's address, storing the corresponding packet transmission path and the frequency of use of the corresponding packet transmission path at said first queue, and transmitting the packet stored in said region memory over the corresponding packet transmission path over which some packets have previously been transmitted to said destination subscriber's address;

when it is determined that no packet has been transmitted to the destination subscriber's address contained in the packet over the corresponding packet transmission path at said second queue corresponding to the destination subscriber's address contained in the packet, processing a transmission path error.

2. The method of claim 1, further comprised of reducing the frequency of use of the packet transmission path at said first queue, after said transmission path error has been processed.

3. The method of claim 2, further comprised of deleting the destination subscriber's address having no frequency of use value at said first queue, after the frequency of use of the packet transmission path at said first queue has been reduced.

4. A method of searching for a packet transmission path in a broadband information and communication system comprising a memory including a first queue of packet transmission paths corresponding to destination subscribers' addresses and a frequency of use of the packet transmission paths corresponding to the destination subscribers' addresses, and a second queue of packet transmission paths corresponding to destination subscribers' addresses, said method comprising the steps of:

receiving and temporarily storing an incoming packet in said memory, said packet containing a destination subscriber's address to which the packet is to be transmitted;

initially searching for, at said first queue, a packet transmission path for transmitting the packet stored in said memory to the destination subscriber's address contained in the packet by determining whether any packet has ever been transmitted to said destination subscriber's address contained in said packet;

when it is determined at said first queue that no packet has ever been transmitted over the packet transmission path corresponding to said destination subscriber's address contained in said packet, searching for, at said second queue, a packet transmission path for transmitting said packet to said destination subscriber's address contained in the stored packet;

storing a searched packet transmission path at said first queue, after the packet transmission path for transmitting said packet stored in said memory at said second queue has been searched; and transmitting said packet stored in said memory over the searched packet transmission path at said first queue.

5. The method of claim 4, further comprised of increasing the frequency of use at said first queue and transmitting the packet over a searched packet transmission path at said second queue, when it is determined that some packets have been transmitted over the searched packet transmission path corresponding to said destination subscriber's address contained in said packet.

6. The method of claim 4, further comprised of reducing the frequency of use of the packet transmission paths at said first queue, when it is determined at said second queue that a corresponding packet transmission path has not been searched for a predetermined time period.

7. The method of claim 6, further comprised of deleting the destination subscriber's address having no frequency of use value at said first queue, after the frequency of use of the packet transmission paths at said first queue has been reduced.

8. A communication device for a broadband communication network, comprising:

a subscriber interface board for interfering with a source subscriber and for transmitting services for the source subscriber to a destination subscriber through said broadband communication network;

a broadband network interface board for interfacing with said broadband communication network; and a central board disposed between the subscriber interface board and said broadband network interface board and including a memory for storing incoming packets from the source subscriber, said memory comprising a first queue for registering a plurality of destination subscriber's addresses, corresponding packet transmission paths for the destination subscriber's addresses and a frequency of use of the corresponding packet transmission paths, and a second queue for registering said plurality of destination subscriber's addresses and the corresponding packet transmission paths, said central control board controlling a packet transmission path selection for communication between the source subscriber and the destination subscriber by:

receiving and temporarily storing an incoming packet containing a destination subscriber's address in said memory;

initially searching for a packet transmission path for transmitting the stored packet to the destination subscriber's address contained in the stored packet at said first queue by determining whether any packet has ever been transmitted to said destination subscriber's address contained in said stored packet;

<when it is determined at said first queue that no packet has ever been transmitted over the packet transmission path corresponding to said destination subscriber's address contained in said stored packet, searching for a packet transmission path for transmitting said stored packet to said destination subscriber's address at second queue;

storing a searched packet transmission path at said first queue, after the packet transmission path for transmitting said stored packet at said second queue has been searched; and transmitting said stored packet over the searched packet transmission path stored at first queue.

9. The communication device of claim 8, further comprised of said central control board increasing the frequency of use at said first queue and transmitting the stored packet over a searched packet transmission path stored at said second queue, when it is determined that some packets have been transmitted over the searched packet transmission path corresponding to said destination subscriber's address contained in said stored packet.

10. The communication device of claim 8, further comprised of said central control board reducing the frequency of use of the packet transmission paths stored at said first queue, when it is determined at said second queue that a corresponding packet transmission path has not been searched for a predetermined time period.

11. The communication device of claim 10, further comprised of said central control board deleting the destination subscriber's address having no frequency of use value at said first queue, after the frequency of use of the packet transmission paths stored at said first queue has been reduced.

12. A method of searching for a packet transmission path in a broadband information and communication system comprising a first queue for registering a plurality of destination subscribers' addresses, corresponding packet transmission paths for the destination subscribers' addresses and a frequency of use of the corresponding packet transmission paths, and a second queue for registering said plurality of destination subscribers' addresses and the corresponding packet transmission paths, said method comprising the steps of:

receiving and temporarily storing an incoming packet containing a destination subscriber's address;

initially searching said first queue for a packet transmission path for the transmission of the stored packet corresponding to the destination subscriber's address contained in the stored packet;

determining whether the packet transmission path registered in said first queue corresponding to the destination subscriber's address contained in the stored packet has been searched;

increasing the frequency of use registered in said first queue by a constant unit and transmitting the stored packet over the packet transmission path registered in said first queue corresponding to the destination subscriber's address, when the packet transmission path registered in said first queue has been searched;

searching said second queue for a packet transmission path for the transmission of the stored packet to said destination subscriber's address, when the packet transmission path registered in said first queue has not been searched;

determining whether the packet transmission path registered in said second queue corresponding to the destination subscriber's address contained in the stored packet has been searched;

transmitting the stored packet over the packet transmission path registered in said second queue corresponding to the destination subscriber's address, when the packet transmission path registered in said second queue has been searched; and alternately, processing a transmission path error, when the packet transmission path registered in said second queue has not been searched.

13. The method of claim 12, further comprised of reducing the frequency of use of the packet transmission path at said first queue, after said transmission path error has been processed.

14. The method of claim 13, further comprised of deleting the destination subscriber's address having no frequency of use value at said first queue, after the frequency of use of the packet transmission path at said first queue has been reduced.

* * * * *